United States Patent
Susella et al.

(10) Patent No.: US 11,502,836 B2
(45) Date of Patent: Nov. 15, 2022

(54) METHOD FOR PERFORMING CRYPTOGRAPHIC OPERATIONS ON DATA IN A PROCESSING DEVICE, CORRESPONDING PROCESSING DEVICE AND COMPUTER PROGRAM PRODUCT

(71) Applicant: STMICROELECTRONICS S.r.l., Agrate Brianza (IT)

(72) Inventors: Ruggero Susella, Milan (IT); Guido Marco Bertoni, Bernareggio (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/149,623

(22) Filed: Jan. 14, 2021

(65) Prior Publication Data
US 2021/0226789 A1 Jul. 22, 2021

(30) Foreign Application Priority Data
Jan. 17, 2020 (IT) .................. 102020000000886

(51) Int. Cl.
*H04L 9/40* (2022.01)
*H04L 9/30* (2006.01)
(Continued)

(52) U.S. Cl.
CPC ............ *H04L 9/3066* (2013.01); *G06F 7/523* (2013.01); *H04L 9/0825* (2013.01); *H04L 9/0869* (2013.01)

(58) Field of Classification Search
CPC ... H04L 9/3066; H04L 9/0825; H04L 9/0869; H04L 9/002; H04L 9/3252; G06F 7/523; G06F 2207/7223
See application file for complete search history.

(56) References Cited

U.S. PATENT DOCUMENTS 8,781,110 B2 7/2014 Gopal et al.
9,772,821 B2 * 9/2017 Feix ..................... H04L 9/3236
(Continued)

FOREIGN PATENT DOCUMENTS

WO 2015/199675 12/2015
WO 2019/089590 5/2019

OTHER PUBLICATIONS

Okeya et al., "A Fast Scalar Multiplication Method with Randomized Projective Coordinates on a Montgomery-Form Elliptic Curve Secure against Side Channel Attacks", pp. 428-439, Apr. 2002 (Year: 2002).*

(Continued)

*Primary Examiner* — Thaddeus J Plecha
(74) *Attorney, Agent, or Firm* — Seed Intellectual Property Law Group LLP

(57) ABSTRACT

A scalar multiplication operation includes an iterative procedure performing a set of operations at each iteration on a bit or on a group of consecutive bits of a secret key. The multiplication operation includes multiplying values of projective format coordinates by a random value. The random value is a product of a random number generated over a range having as end value a first value, with a second value, which is larger than said first value. The first value is a power of two of a word size multiplied by a multiplier value, minus one. The second value is equal to a power of two of a number of bits of the coordinates divided by the first value. The multiplier value is an integer greater than or equal to one and smaller than a ratio of said number of bits to the word size.

20 Claims, 2 Drawing Sheets

(51) Int. Cl.
*G06F 7/523* (2006.01)
*H04L 9/08* (2006.01)

(56) References Cited

U.S. PATENT DOCUMENTS

| | | |
|---|---|---|
| 2009/0067619 A1 | 3/2009 | Eberle et al. |
| 2010/0322422 A1* | 12/2010 | Al-Gahtani ........... H04L 9/3066 380/255 |
| 2012/0207298 A1 | 8/2012 | Meyer |
| 2015/0288520 A1 | 10/2015 | Jacobson et al. |
| 2019/0379529 A1 | 12/2019 | Meyer et al. |
| 2020/0351073 A1 | 11/2020 | Loiseau |
| 2021/0165633 A1 | 6/2021 | Guilley et al. |
| 2021/0243006 A1* | 8/2021 | Meyer .................... G06F 7/722 |
| 2022/0075879 A1 | 3/2022 | Hamburg et al. |

OTHER PUBLICATIONS

Heyszl et al., "Localized Electromagnetic Analysis of Cryptographic Implementations," Cryptographers' Track at the RSA Conference, Feb. 27-Mar. 2, 2012, San Francisco, CA, pp. 231-244.

Menezes et al., *Handbook of Applied Cryptography*, CRC Press, Boca Raton, FL, Chapter 14, "Efficient Implementation," pp. 591-634, 1997.

Mukhtar et al., "Machine-Learning-Based Side-Channel Evaluation of Elliptic-Curve Cryptographic FPGA Processor," Appl. Sci. 9(64): 2019, 20 pages.

Wikipedia, "Swap (computer programming)," downloaded on Jul. 28, 2020, from https://en.wikipedia.org/w/index.php?title=Swap_(computer_programming)&oldid=880864496, 4 pages.

* cited by examiner

METHOD FOR PERFORMING CRYPTOGRAPHIC OPERATIONS ON DATA IN A PROCESSING DEVICE, CORRESPONDING PROCESSING DEVICE AND COMPUTER PROGRAM PRODUCT

BACKGROUND

Technical Field

The present description relates to techniques for methods for performing cryptographic operations on data in a processing device operating with a given word size.

For example, described embodiments may be directed to an asymmetric cryptographic procedure operating over a finite field of given order which uses ECC (Elliptic Curve Cryptography), such as implementing a point multiplication by a Montgomery ladder.

Various embodiments may apply, e.g., to smartcard, microcontrollers, set-top-box using an encryption or digital signature scheme.

Description of the Prior Art

Cryptographic protocols, or encryption protocols, are abstract or concrete protocols that perform a security-related function and apply cryptographic methods, often as sequences of cryptographic primitives.

In the field of protection from Side Channel Attacks in devices which use encryption algorithms, e.g., microcontroller implementing encryption algorithms, such as ECC or RSA, vertical Side Channel Attacks (SCA) are known, where the attacker can encrypt arbitrary data (input) using the device, in order to get the cryptographic key used by the encryption algorithm. The attackers record side channel information during encryption of known input data, the side channel being represented by power consumption, electromagnetic radiation, or other similar quantities.

The side channel is linked with the data processed by the device, which are the cryptographic key and the attacker's data fed as input, which represent therefore known data.

The attacker records many "traces" with different known input data and a constant unknown key, making hypotheses on the value of a portion of the cryptographic key, and uses statistical methods to verify such hypotheses using the traces. To apply such statistical methods the attacker needs to use many traces, each with different and known input data and constant key.

However, in asymmetric cryptography there are mathematical ways to modify the secret key for each execution such that the result of the operation does not change, although the data used during the computation changes. Thus, the attacker cannot collect many traces because the key is not constant anymore.

For this reason, when the attacker needs to work on a single trace, the attacker deploys the so-called Horizontal Attacks.

In a device to be protected, e.g., processing unit or microcontroller, usually there is a memory, which stores input/output data and intermediate values, a controller, which reads words from RAM memory and stores them into registers, then "calls" the multiplier on registers, e.g., a multiplier unit or circuit which performs multiplication operation on operands stored in the registers. The multiplier multiplies operands and writes the result to the RAM memory. In such a situation over 95% of the computation is done within the multiplier.

To this regard, in FIG. 1 it is shown a processing unit or core 10 which includes a controller unit or circuit 11, which reads words, indicated as a and b in FIG. 1, from a memory 13, e.g., a RAM memory, and stores them into registers provided in the controller 11, then calls a multiplier circuit 12 on the content of the registers, words a, b. The multiplier 12 performs multiplication operation on operands a, b stored in the registers of the controller 11. The multiplier 12 multiplies operands, e.g., performs a modulo n multiplication R=a·b mod n, and writes the result R to the RAM memory 13.

With reference to a conventional processing device architecture, the controller 11 and the multiplier 12 may correspond to the control circuit and ALU of a processing circuit such as a CPU, while the memory 13 can be external with respect to the processing device 10.

In asymmetric cryptography it can be used for instance RSA (Rivest-Shamir-Adleman) cryptography which involves a multiplication loop implementing Modular Exponentiation, or ECC (Elliptic Curve Cryptography) which involves a multiplication loop implementing Elliptic Curve Scalar Multiplication.

In ECC cryptography a main loop implementing iteratively point multiplication of an operand corresponding to point P by the secret key k, to obtain kP, is implemented, for example, as shown in the following group of instructions (1), representing the iteration for each secret key k bit or group of bits $k_i$:

$L1.$ if $k_i=0$:

$L2.$ $Q_1=\text{Add}(Q_1,Q_0)$ $L3.$ $Q_0=\text{Double}(Q_0)$ $L4.$ else:

$L5.$ $Q_0=\text{Add}(Q_0,Q_1)$ $L6.$ $Q_1=\text{Double}(Q_1)$ \hfill (1)

where $k_i$ is the i-th bit or group of consecutive bits, e.g., word, of the secret key k, $Q_o$, $Q_1$ a first and second loop variable respectively, which are assigned reading the values of point P from the corresponding addresses in the registers of the controller unit 11, e.g., $Q_o$ is set to zero value, and $Q_1$=P, Add and Double the addition and multiply by 2 operations. $Q_1,Q_0$ correspond to points expressed in projective format by the homogeneous coordinates (X,Y,Z) where the point (x,y)=X/Z, Y/Z. $Q_o$ is set to zero value, a value representing the point at infinity which in homogeneous coordinates is represented by Z=0. At the beginning of the iterations $Q_o$ is set to zero value, and $Q_1$=P, then they take different values during the different iterations depending on the bits of the secret key k. The set of operations L1-L6 is also called a Montgomery ladder and can be used to implement modular exponentiation or scalar multiplication. The Montgomery ladder can be beneficial when timing is exposed to an attacker performing a side-channel attack.

Other projective formats could be for instance (x,y)=X/$Z^2$, Y/$Z^3$ or other format, the solution here described being adapted to the different forma with a suitable number of multiplications. For instance if the projective format is (x,y)=X/$Z^2$, Y/$Z^3$, the randomization may be $X=((X*r)\bmod N)*r \bmod N$ $Y=(((Y*r)\bmod N)*r \bmod N)*r \bmod N$ $Z=Z*r \bmod N$ where N is the order or size of the finite field over which the Elliptic Curve Cryptography is implemented.

The main loop (1) of the point multiplication thus includes that:

for each bit or groups of consecutive bits $k_i$ of the secret key k, for example each i-th bit if such bit $k_i$ is zero, the second loop variable $Q_1$ is set, written in the same address of controller 11 register corresponding to the operand variable, equal to the sum of the two variables $Q_1, Q_0$ and the first variable $Q_0$ is multiplied by two, else the first variable $Q_0$ is equal to the sum of the two variable $Q_1, Q_0$ and the second variable $Q_1$ is multiplied by two.

Three families of Horizontal Attacks are usually identified:

Attacks on Secret Bit Manipulation
Attacks on Addresses
Attacks on Data

In particular regarding attacks on Data, such attacks can be performed on the basis of the input and output values of two iterations.

For instance in the case of ECC if the output of Double operation at iteration i is used as input of the Double operation at step i+1, is $k_i = k_{i+1}$, and the attacker can recognize this pattern.

A known solution involves that at each iteration i, e.g., for each bit $k_i$ of the secret key k, it is performed a randomization of the values X, Y, Z of the projective format coordinates representing the first variable $Q_o$ and the second variable $Q_1$, the point of the ECC cryptography expressed in projective format, by multiplying such values X, Y, Z of the projective format coordinates by a random value using a Montgomery Multiplication with a given modulus value N, defining the order or size of the finite field, such modulus value N being represented by a number of bits n usually equal to the length l in bits of the operands.

For instance it is generated a random integer value r by the integer random generation function randint (sv, ev) (a function which is known in Python, Java or Matlab language) over a range going from a given start value sv, e.g., 1, to an end value ev of N−1, N being the value defining the order of the finite field which is used to represent the operands. Thus, the order N can be for instance, $2^{256} - 2^{224} + 2^{192} + 2^{96} - 1$, which is a prime number. N may be chosen as a prime number close to a multiple of the word, a little less than $2^{m*WS}$, WS being the word size and m the multiple value, for efficiency, but it can be also much smaller.

$$r = \text{randint}(1, N-1)$$

The integer random generation function randint is an example of an operation including taking random bits from a TRNG (True random number generator) or CSPRNG (Cryptographically strong pseudo random number generator).

The each new homogeneous coordinate nX, nY, nZ is obtained by multiplying the values X, Y, Z of the current projective format coordinates by the random value r using a multiplication exploiting the Montgomery Multiplication procedure with a given modulus value p:

$$nX = X*r \bmod N$$

$$nY = Y*r \bmod N$$

$$nZ = Z*r \bmod N$$

The result is still correct as for the point (x,y) x=nX/nZ=X*r/Z*r=X/Z

This approach may be used, but the randomization operation has to be fast with respect to the modular multiplication.

Also, even if the randomization operation were designed to be sufficiently fast, another inconvenient is tied to the fact that the Montgomery multiplication is of the form:

$$M(a, b) \sim \frac{ab + (abN' \bmod 2^l)N}{2^l}$$

where a is a generic first Montgomery operand, e.g., a coordinate of first loop variable $Q_0$, b a generic second Montgomery operand, e.g., a coordinate of second loop variable $Q_1$ and N' is an element made by a single word. l is the given number of bits representing the values of the values X, Y, Z of the projective format coordinates and is a parameter of the Montgomery multiplication. If it is desired to perform a modular multiplication of integers modulo N, the given number of bits l is a power of two and greater than N.

The parameter l expressed in bits depends on the implementation and respects the condition l>=bitsize(N).

Assuming a and b are bounded by $2^l$, the computational cost is roughly of $$\left(\frac{l}{WS}\right)^2 + \frac{l}{WS} \cdot \frac{n}{WS} + \frac{l}{WS}$$

word multiplications, where WS indicates the system word size. Even with a small value of the second operand b the values (abN' mod $2^l$) is still a large value, the computation cost of (abN' mod $2^l$)N even with a small value of b is $$\frac{l}{WS} \cdot \frac{n}{WS}$$

word multiplications, which since l>=n, is at least $$\left(\frac{n}{WS}\right)^2.$$

BRIEF SUMMARY

Embodiments may relate to techniques of performing cryptographic operations on data in a processing device operating with a given word size. In an embodiment, an asymmetric cryptographic procedure operating over a finite field is applied having a given order, said asymmetric cryptographic procedure including performing a scalar multiplication operation between at least one operand representing a curve point expressed by projective format coordinates and a secret key, said scalar multiplication operation including an iterative procedure performing a set of operations at each iteration for each one or each group of consecutive bits of the secret key, said multiplication procedure comprising, at each iteration, randomizing said values, represented by a given number of bits, of the projective format coordinates representing said at least one operand by multiplying such values of the projective format coordinates by a random value.

Embodiments may provide a method for performing cryptographic operations on data in a processing device including performing a multiplication operation using randomization of variables which solves the drawbacks of the prior art and in particular is fast and has a low computational cost.

One or more embodiments may refer to a corresponding processing device performing the method and a computer program product that can be loaded into the memory of at least one computer and comprises parts of software code that are able to execute the steps of the method when the product is run on at least one computer. As used herein, reference to such a computer program product is understood as being equivalent to reference to a computer-readable means containing instructions for controlling the processing system in order to co-ordinate implementation of the method according to the embodiments. Reference to "at least one computer" is evidently intended to highlight the possibility of the present embodiments being implemented in modular and/or distributed form.

According to an embodiment of a solution described herein, the method for performing cryptographic operations on data in a processing device operating with a given word size, including applying an asymmetric cryptographic procedure operating over a finite field having a given order, said asymmetric cryptographic procedure including performing a scalar multiplication operation between at least one operand, representing a curve point expressed by projective format coordinates, and a secret key, said scalar multiplication operation including an iterative procedure performing a set of operations at each iteration for each bit or each group of consecutive bits of the secret key, said multiplication procedure comprising, at each iteration, and randomizing values, represented by a given number of bits, of the projective format coordinates representing said at least one operand by multiplying such values of the projective format coordinates by a random value, wherein said randomization operation includes that said random value is obtained as the product of a random generated value, which is generated over a range having as an end value a first given value, with a second value which is larger than said first given value, and said first given value being a power of two of the wordsize or of a multiple of the word size minus one, said second value being equal to a power of two of said given number of bits divided by the first value, a multiplier value of the wordsize in said multiple being a small integer, at least smaller than the ratio of said given number of bits to the word size.

In variant embodiments, the upper limit for said multiplier value is 4, in particular said multiplier value in said multiple is 1 or 2.

In variant embodiments, said random value is generated as random value selected in a range having as a start value the value one.

In variant embodiments, said asymmetric cryptographic procedure is an ECC procedure, the at least one operand is a point on the elliptic curve and the multiplication operation is the ECC scalar multiplication.

In variant embodiments, said set of operations represents a Montgomery ladder operation.

In variant embodiments, said iterative procedure includes performing said Montgomery ladder implementing iteratively point multiplication of the secret key by the at least one operand, assigning a first and a second loop variable, includes performing said Montgomery ladder representing set of operations including:

for each bit of the secret key, if such bit is zero, the second variable is set equal to the sum of the two variable and the first variable is multiplied by two;

else the first variable is equal to the sum of the two variables and the second variable is multiplied by two; and said randomization operation being performed on the projective format coordinates expressing said first variable and a second variable.

In variant embodiments, said iterative procedure is performed dividing the bits of the secret key in groups of consecutive bits, and includes performing a set of operations at each iteration for each group of bits of the secret key.

Described embodiments refer also to embodiments of a processing device configured to perform the steps of the method of any of the previous embodiments.

Embodiments here described refer also to a computer program product that can be loaded into the memory of at least one computer and comprises parts of software code that are able to execute the steps of the method of any of the previous embodiments when the product is run on at least one computer.

In an embodiment, a method comprises performing cryptographic operations on data in a processing device operating with a word size, including applying an asymmetric cryptographic procedure operating over a finite field having an order, the asymmetric cryptographic procedure including performing a scalar multiplication operation between at least one operand, representing a curve point expressed by projective format coordinates, and a secret key, the scalar multiplication operation including an iterative procedure performing a set of operations at each iteration on a bit or on a group of consecutive bits of the secret key, the multiplication operation comprising, at each iteration, randomizing values represented by a number of bits, of the projective format coordinates representing said at least one operand by multiplying the values of the projective format coordinates by a random value, wherein the randomizing values includes generating a random number over a range having as an end value a first value, and multiplying the random number and a second value, which is larger than said first value, said first value is a power of two of the word size multiplied by a multiplier value, minus one, said second value is equal to a power of two of said number of bits divided by the first value, the multiplier value being an integer greater than or equal to one and smaller than a ratio of said number of bits to the word size. In an embodiment, an upper limit for the multiplier value is 4. In an embodiment, the multiplier value is 1 or 2. In an embodiment, the range has a start value of one. In an embodiment, the asymmetric cryptographic procedure is an Elliptic Curve Cryptography (ECC) procedure, the at least one operand is a point on an elliptic curve and the multiplication operation is an ECC scalar multiplication. In an embodiment, the set of operations represents a Montgomery ladder. In an embodiment, each iteration of the iterative procedure is performed on a bit of the secret key and includes: if such bit is zero, setting the second variable equal to a sum of the two variables and multiplying the first variable by two; otherwise, setting the first variable equal to the sum of the two variables and multiplying the second variable by two; and performing the randomization operation on the projective format coordinates expressing the first variable and a second variable. In an embodiment, the iterative procedure is performed dividing the bits of the secret key in groups of consecutive bits, and includes performing a set of operations at each iteration for a group of bits of the secret key.

In an embodiment, an apparatus comprises: a memory; and cryptographic circuitry having a word size and coupled to the memory, wherein the cryptographic circuitry, in operation, applies an asymmetric cryptographic procedure operating over a finite field having an order, the asymmetric cryptographic procedure including performing a scalar multiplication operation between at least one operand, representing a curve point expressed by projective format coordinates, and a secret key, the scalar multiplication operation including an iterative procedure performing a set of operations at each iteration on a bit or on a group of consecutive bits of the secret key, the multiplication operation comprising, at each iteration, randomizing values represented by a number of bits, of the projective format coordinates representing said at least one operand by multiplying the values of the projective format coordinates by a random value, wherein the randomizing values includes generating a random number over a range having as an end value a first value, and multiplying the random number and a second value, which is larger than said first value, said first value is a power of two of the word size multiplied by a multiplier value, minus one, said second value is equal to a power of two of said number of bits divided by the first value, the multiplier value being an integer greater than or equal to one and smaller than a ratio of said number of bits to the word size. In an embodiment, an upper limit for the multiplier value is 4. In an embodiment, the multiplier value is 1 or 2. In an embodiment, the range has a start value of one. In an embodiment, the asymmetric cryptographic procedure is an Elliptic Curve Cryptography (ECC) procedure, the at least one operand is a point on an elliptic curve and the multiplication operation is an ECC scalar multiplication. In an embodiment, the set of operations represents a Montgomery ladder. In an embodiment, each iteration of the iterative procedure is performed on a bit of the secret key and includes: if such bit is zero, setting the second variable equal to a sum of the two variables and multiplying the first variable by two; otherwise, setting the first variable equal to the sum of the two variables and multiplying the second variable by two; and performing the randomization operation on the projective format coordinates expressing the first variable and a second variable. In an embodiment, the iterative procedure is performed by dividing the bits of the secret key into groups of consecutive bits, and includes performing a set of operations at each iteration for a group of bits of the secret key.

In an embodiment, a non-transitory computer-readable medium has contents which configure a processing device to perform cryptographic operations on data using a word size, the performing cryptographic operations including applying an asymmetric cryptographic procedure operating over a finite field having an order, the asymmetric cryptographic procedure including performing a scalar multiplication operation between at least one operand, representing a curve point expressed by projective format coordinates, and a secret key, the scalar multiplication operation including an iterative procedure performing a set of operations at each iteration on a bit or on a group of consecutive bits of the secret key, the multiplication operation comprising, at each iteration, randomizing values represented by a number of bits, of the projective format coordinates representing said at least one operand by multiplying the values of the projective format coordinates by a random value, wherein the randomizing values includes generating a random number over a range having as an end value a first value, and multiplying the random number and a second value, which is larger than said first value, said first value is a power of two of the word size multiplied by a multiplier value, minus one, said second value is equal to a power of two of said number of bits divided by the first value, the multiplier value being an integer greater than or equal to one and smaller than a ratio of said number of bits to the word size. In an embodiment, an upper limit for the multiplier value is 4. In an embodiment, the multiplier value is 1 or 2. In an embodiment, the contents comprise instructions executed by cryptographic circuitry of the processing device.

BRIEF DESCRIPTION OF THE SEVERAL VIEWS OF THE DRAWINGS

The disclosure will now be described purely by way of a non-limiting example with reference to the annexed drawings, in which.

DETAILED DESCRIPTION

Figure 1:
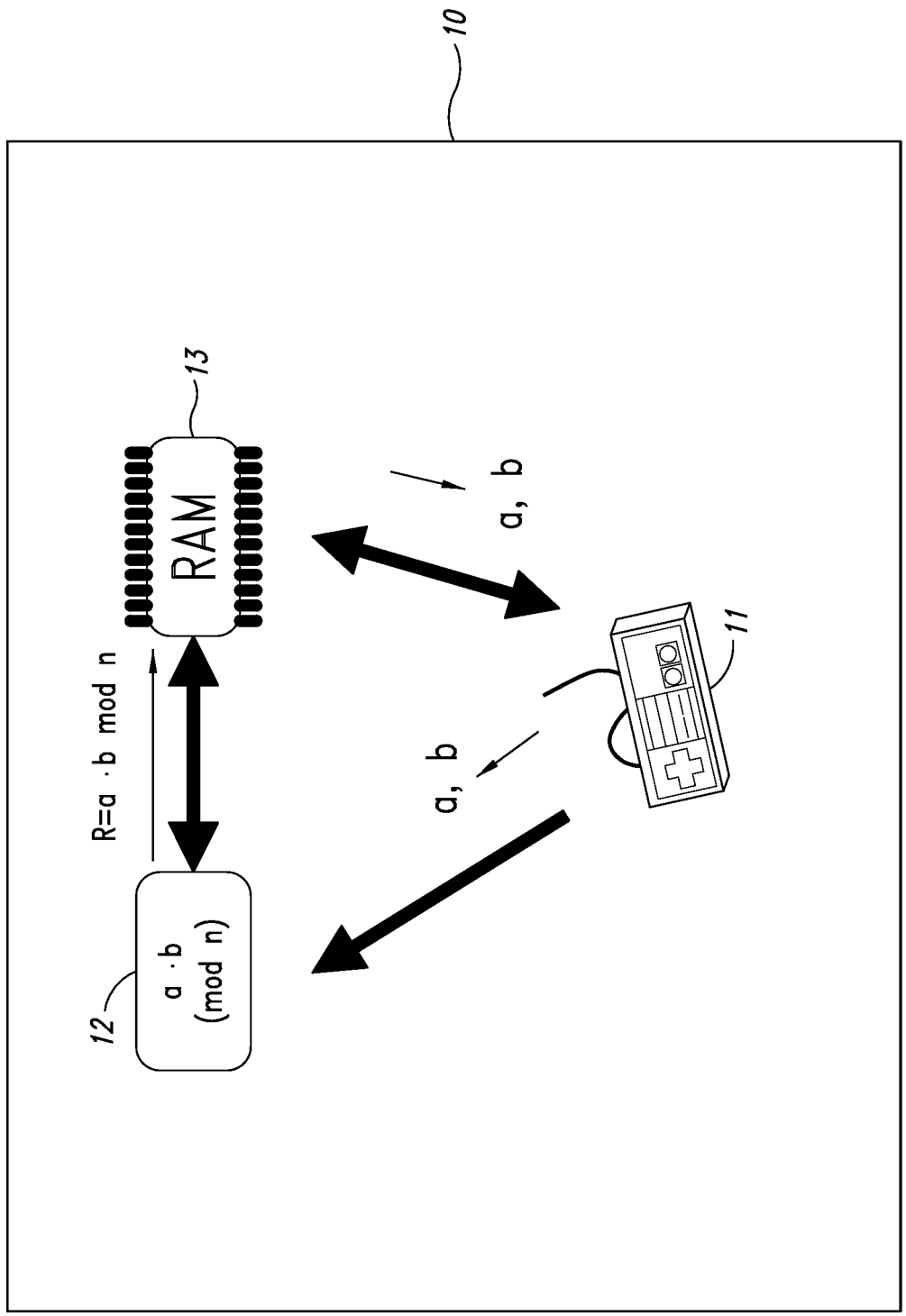
FIG. 1 was discussed in the foregoing.

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

The solution here described refers to a method for performing cryptographic operations on data in a processing device operating with a given word size, including applying an asymmetric cryptographic procedure operating over a finite field having a given order, the asymmetric cryptographic procedure including performing a scalar multiplication operation between at least one operand, representing a curve point expressed by projective format coordinates and a secret key, the scalar multiplication operation including an iterative procedure performing a set of operations at each iteration for each bit or each group of consecutive bits of the secret key, the multiplication procedure comprising, at each iteration, randomizing values, represented by a given number of bits, of the projective format coordinates representing said at least one operand by multiplying such values of the projective format coordinates by a random value, for example using a point multiplication, such as a Montgomery Multiplication, wherein the random value is a small integer which is multiplied by a larger integer, which can be treated like one or few words. In particular the randomization operation includes that the random value is obtained as the product of a random generated value, which is generated over a range having as an end value a first given value, with a second value which is larger than the first given value. In particular, the first given value is a power of two of the wordsize or of a multiple of the word size minus one, the second value being equal to a power of two of said given number of bits divided by the first value, a multiplier value of the wordsize in said multiple being a small integer, at least smaller than the ratio of said given number of bits to the word size.

Thus, in an embodiment the random integer value r is generated, by the integer random generation function randint (sv, ev), a function of generation of random numbers over a range going from a given start value sv, e.g., 1, to an end value ev, which is two to the power of value of the word size minus one $2^{m*WS}-1$, where m is a small integer multiplier number, (e.g., m=1 or m=2). Here an operand, such as ECC point coordinate $X(Q_0)$ may be represented, given the finite field order N, WS indicating the word size, and w the size in words, the number of words, of the operand, by the polynomial representation:

$$Q0 = a_n*2^{w*WS} + a_{n-1}*2^{w-1*WS} + \ldots + a_1*2^{1*WS} + a_0$$

where $a_n \ldots a_0$ are the polynomial coefficients. For instance N has bit size 1024, the word size WS is 16 bit and the number of words w required to represent an operand is 64.

For example, N is a prime number, which as mentioned, defines the finite field. The bitsize n of N in further embodiment can be near the value 256. The value wordsize WS may be for instance 8, 16, 32 or 64.

The operands are represented in Montgomery representation, and they are by definition smaller than $2^l$ where the operand length l>=bitsize(N). In most cases, the operand length is equal to the bitsize n of the finite field N, l=n, but sometimes the operand length is greater, e.g., by a wordsize WS, than bitsize n, l=n+WS.

The number of words w to represent an operand is l/WS, the ratio of the operand length l in bits to the wordsize WS.

The randint function result is multiplied by a number which is larger than the end value ev of the range of the random value, in particular much larger as $2^{l-m*WS}$, two to the power of the difference between said length l of the operands and a small multiple of the word size WS, m*WS. m is the multiplier which is a small integer. The multiplier m when is set to the minimum value, m=1, may provide the lowest computational cost, however if m=2, the computational cost is greater but the randomization is more effective. As also indicated in the following, other choices are also possible, in order to lower the computational cost the multiplier m should at least much smaller than the ratio of the length of the operand 1 to the word size WS.

Thus, choices of the value of the multiplier m may usually be 1 or 2. The multiplier m may desirably be less or equal than the order N divided by the wordsize WS, m<=N/WS or m*WS<=N $$r = \mathrm{randint}(1, 2^{m*WS}-1)*2^{l-m*WS}$$

The maximum value of the random value r typically may be below $2^{m*WS}-1$.

Thus the randomization operation obtaining the random value r is obtained as the product of a random generated value, by the random generation function randint, which is generated over a range having as an end value ev a first given value $2^{m*WS}$, with a second value $2^{l-m*WS}$ which is larger, for example, much larger, than the first value, the first and second value being powers of two the sum of which exponents is equal to the length 1 of the operands.

Then, each new homogeneous coordinate nX, nY, NZ is obtained by multiplying the values X, Y, Z of the current projective format coordinates by the random value r using a multiplication exploiting the Montgomery Multiplication procedure:

$$nX = MM(X, r)$$

$$nY = MM(Y, r)$$

$$nZ = MM(Z, r)$$

the Montgomery multiplication still being:

$$MM(a, b) \sim \frac{ab + (abN' \mod 2^l)N}{2^l}$$

This allows a simplification as:
ab=a*randint (1, $2^{m*WS}-1$)*$2^{l-m*WS}$, where computation of the term a*randint (1, $2^{m*WS}-1$) costs $$m\frac{l}{WS}$$

word multiplications, while the computation cost of the multiplication between (a*randint(1,$2^{(m*WS)-1}$) and $2^{l-m*WS}$ is negligible compared to the number of multiplications executed in the Montgomery domain; and
abN' mod $2^l$=wrd*$2^{l-m*WS}$, where wrd is a value upper bounded by $2^{m*WS}$, thus (abN' mod $2^l$)N=wrd*N*$2^{l-m*WS}$, thus the computation cost of (abN' mod $2^l$)N is m*n/WS word multiplications. It is also:

$$\mathrm{wrd} = a*\mathrm{randint}(\ )*N' \mod 2(WS)$$

Therefore the total costs of this Montgomery Multiplication is of $$m\frac{l}{WS} + m\frac{n}{WS} + m.$$

Figure 2:
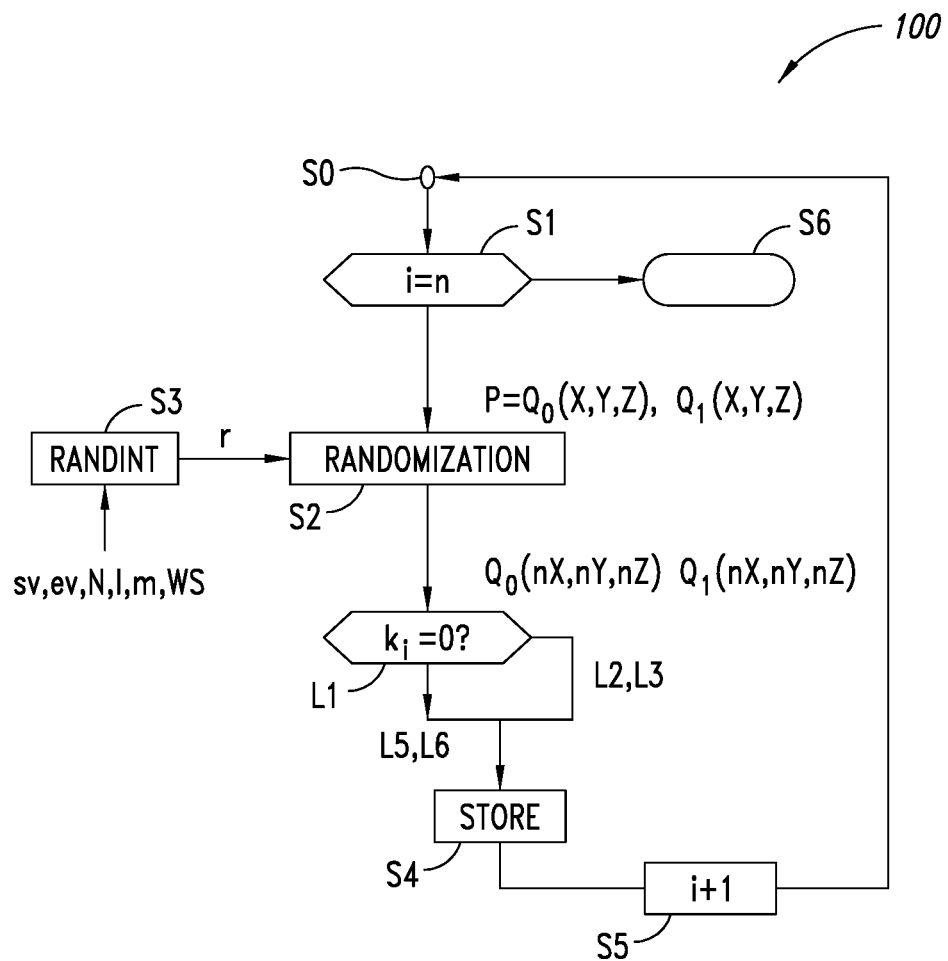
FIG. 2 represents a flow diagram of an embodiment of a method here described.

In FIG. 2 it is shown a flow diagram exemplary of an embodiment 100 of operations of the method here described.

The embodiment refers to an ECC cryptography, and represents steps of the main loop L1-L6 already described, which implements iteratively point multiplication of ECC curve point P by the secret key, using loop variables $Q_1$ and $Q_0$. Thus S0 indicates a point at which the ECC cryptography performs execution of the loop iteratively for each i-th bit $k_i$ of the secret key k, starting from the first bit, e.g., i=0. Step S1 is the test which implements the iterative loop along with return step S5, in particular is verified if i=n, all the loop iterations for all the bits $k_i$ has been performed. In the affirmative, the procedure continues with the randomization S2 and the scalar multiplication L2-L6. Otherwise the procedure is ended S6. Then for each iteration the homogeneous coordinates X,Y,Z in loop variables $Q_0$, $Q_1$ are subjected to a randomization S2, randomizing the values X, Y, Z of the projective format coordinates representing the first and second variable by multiplying such values X, Y, Z of the projective format coordinates by a random value r. Such value random r to operation S2 is provided by a step S3 in which said random value r is obtained as the product of a random generated value, by the function randint, which is generated over a range having as an end value ev a first given value $2^{m*WS}-1$, with a second value $2^{l-m*WS}$ which is larger than the first value, said first and second value being powers of two which the sum of which exponents is equal to the length l of the operands, the exponent of the first value being a sub-multiple of the second value. In particular the random value r is generated as random value selected in a range having as an end value ev two to the power of value of small multiple of the word size WS, multiplied by two to the power of the difference between said length l of the operands and said small multiple of the word size WS value. Thus, step S3 is shown as receiving, from a memory of the processing device 10 or another control processor associated to the processing device 1, the values of start sv, end ev, order N, length l, word size WS.

Then, the step S2 outputs randomized coordinates nX, nY, NZ of the variables $Q_1, Q_0$ on which the main loop of the point multiplication is performed, e.g., thus includes, e.g., in step L1, for each bit $k_i$ of the secret key k is checked its value.

If such bit $k_i$ is zero, the second variable $Q_1$ is set, written in the same address of controller 11 register corresponding to the operand variable, equal to the sum of the two variables $Q_1, Q_0$ and the first variable $Q_0$ is multiplied by two (operation L2, L3), else the first variable $Q_0$ is equal to the sum of the two variables $Q_1, Q_0$ and the second variable $Q_1$ is multiplied by two (operations L5, L6).

In both cases the values of the two variables $Q_1, Q_0$ are stored at each iteration, operation S4, in the RAM memory 13 to be stored then as final result R in the RAM 13 as result of the multiplication at the end of the iterations, for instance when i=n, the all the bit $k_i$ of the key k have been used, and the iterative scalar multiplication 100 is brought to the end, operation S6. After the store S4 in RAM 13, a return to step S0 is performed incrementing the index i.

The solution according to the various embodiments here described facilitates obtaining the following advantages.

This solution advantageously uses as randomization operation a modular multiplication by a random word, which has reduced costs in terms of computational cost.

A normal Montgomery multiplication with single random word would cost $$\left(\frac{l}{WS}\right)^2 + \frac{l}{WS} \cdot \frac{n}{WS} + \frac{l}{WS}$$

word multiplications. The solution here described involves a computational cost of $$m\frac{l}{WS} + m\frac{n}{WS} + m$$

word multiplications.

Advantageously here there are no quadratic terms as long as multiplier m<<l/WS, e.g., if l is 1024 and WS 64 the multiplier m should be much smaller than 16. In variant embodiments an upper limit to the value of the multiplier m is 4.

Since at least three multiplications per iteration are needed, this significantly reduces latency compared to a full modular multiplication.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

In the embodiment described the iterative procedure includes performing a set of operations, L2-L6, at each iteration for each one bit $k_i$ of the secret key k. However the iterative procedure can be performed dividing the bits of the secret key k in groups of consecutive bits, e.g., pair of bits $(k_i, k_{i+1})$ or a greater number of bits in the group, and includes performing a set of operations at each iteration for each group of bits of the secret key k, of course performing a lower number of iterations, indicated here with K. For instance the iterative procedure may be in this case:

for i from 0 to K:

$Q=2*Q$ $Q=Q+T[e_w]$ where Q is the only intermediate variable and T is a table containing $2^w$ multiples of the input point, w being the size in words of the operands, $e_w$ being the group of k bit of size w.

Since an attacker may notice that table $T[e_w]$ is used in all iterations where the scalar window ($T[e_w]$) is the same to gain information on the secret key k, it is provided loading the table $T[e_w]$ and randomize it by randomizing the values X, Y, Z, represented by a given number l of bits, of the projective format coordinates representing the operands by multiplying such values X, Y, Z of the projective format coordinates by a random value r, by such randomization operation S2 including that the random value r is obtained as the product of a random generated value, generated over a range having as an end value ev a first given value $2^{m*WS}$, with a second value $2^{l-m*WS}$ which is larger than the first given value $2^{m*WS}$, such first value $2^{m*WS}$ being a power of two of the wordsize WS or of a multiple m*WS of the word size WS minus one, the second value $2^{l-m*WS}$ being equal to a power of two of the length l of the operand divided by the first value $2^{m*WS}$, a multiplier value m in said multiple m*WS being a small integer.

In the method here described the input values to scalar multiplications are an integer (secret key k) and a point, e.g., $Q_o$ or Q. Then the loop of the iterative procedure computes on (at least) two points by performing point addition. In case more than one bit of the key k is processed for each iteration, the loop will compute on more than two points.

Furthermore, while an embodiment here is described with reference to an implementation of the point multiplication in elliptic curve multiplication as a Montgomery ladder, the method here described can be applied to other scalar multiplication, such as Double and Add, windowed method, sliding-window method, w-ary non-adjacent form (wNAF) method, or other methods which include an operation of randomizing the values, represented by a given number of bits, of projective format coordinates representing at least one operand by multiplying such values of the projective format coordinates by a random value, also in this cases the randomization operation further including that said random value is obtained as the product of a random generated value, which is generated over a range having as an end value a first given value, with a second value which is larger than the first given value, the first value being a power of two of the wordsize or of a multiple of the word size, said second value being equal to a power of two of the length of the operand divided by the first value, a multiplier value in said multiple being a small integer.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of performing cryptographic operations on data in a processing device operating with a word size, including applying an asymmetric cryptographic procedure operating over a finite field having an order, the asymmetric cryptographic procedure including performing a scalar multiplication operation between at least one operand, representing a curve point expressed by projective format coordinates, and a secret key, the scalar multiplication operation including an iterative procedure performing a set of operations at each iteration on a bit or on a group of consecutive bits of the secret key, the multiplication operation comprising, at each iteration,
    randomizing values represented by a number of bits, of the projective format coordinates representing said at least one operand by multiplying the values of the projective format coordinates by a random value, wherein
        the randomizing values includes generating a random number over a range having as an end value a first value, and multiplying the random number and a second value, which is larger than said first value,
        said first value is a power of two of the word size multiplied by a multiplier value, minus one,
        said second value is equal to a power of two of said number of bits divided by the first value, the multiplier value being an integer greater than or equal to one and smaller than a ratio of said number of bits to the word size.

2. The method according to claim 1, wherein an upper limit for the multiplier value is 4.

3. The method of claim 1 wherein the multiplier value is 1 or 2.

4. The method according to claim 1, wherein the range has a start value of one.

5. The method according to claim 1, wherein the asymmetric cryptographic procedure is an Elliptic Curve Cryptography (ECC) procedure, the at least one operand is a point on an elliptic curve and the multiplication operation is an ECC scalar multiplication.

6. The method according to claim 5, wherein the set of operations represents a Montgomery ladder.

7. The method according to claim 6, wherein each iteration of the iterative procedure is performed on a bit of the secret key using first and second loop variables and includes:
    if such bit is zero, setting the second loop variable equal to a sum of the first and second loop variables and multiplying the first loop variable by two;
    otherwise, setting the first loop variable equal to the sum of the first and second loop variables and multiplying the second loop variable by two; and
    performing the randomization operation on the projective format coordinates expressing the first loop variable and the second loop variable.

8. The method according to claim 1, wherein the iterative procedure is performed dividing the bits of the secret key in groups of consecutive bits, and includes performing a set of operations at each iteration for a group of bits of the secret key.

9. An apparatus, comprising:
    a memory; and
    cryptographic circuitry having a word size and coupled to the memory, wherein the cryptographic circuitry, in operation, applies an asymmetric cryptographic procedure operating over a finite field having an order, the asymmetric cryptographic procedure including performing a scalar multiplication operation between at least one operand, representing a curve point expressed by projective format coordinates, and a secret key, the scalar multiplication operation including an iterative procedure performing a set of operations at each iteration on a bit or on a group of consecutive bits of the secret key, the multiplication operation comprising, at each iteration, randomizing values represented by a number of bits, of the projective format coordinates representing said at least one operand by multiplying the values of the projective format coordinates by a random value, wherein
        the randomizing values includes generating a random number over a range having as an end value a first value, and multiplying the random number and a second value, which is larger than said first value,
        said first value is a power of two of the word size multiplied by a multiplier value, minus one,
        said second value is equal to a power of two of said number of bits divided by the first value, the multiplier value being an integer greater than or equal to one and smaller than a ratio of said number of bits to the word size.

10. The apparatus according to claim 9, wherein an upper limit for the multiplier value is 4.

11. The apparatus of claim 9 wherein the multiplier value is 1 or 2.

12. The apparatus according to claim 9, wherein the range has a start value of one.

13. The apparatus according to claim 9, wherein the asymmetric cryptographic procedure is an Elliptic Curve Cryptography (ECC) procedure, the at least one operand is a point on an elliptic curve and the multiplication operation is an ECC scalar multiplication.

14. The apparatus according to claim 13, wherein the set of operations represents a Montgomery ladder.

15. The apparatus according to claim 14, wherein each iteration of the iterative procedure is performed on a bit of the secret key using first and second loop variables and includes:
if such bit is zero, setting the second loop variable equal to a sum of the first and second variables and multiplying the first loop variable by two;
otherwise, setting the first loop variable equal to the sum of the first and second loop variables and multiplying the second loop variable by two; and
performing the randomization operation on the projective format coordinates expressing the first loop variable and the second loop variable.

16. The apparatus according to claim 9, wherein the iterative procedure is performed by dividing the bits of the secret key into groups of consecutive bits, and includes performing a set of operations at each iteration for a group of bits of the secret key.

17. A non-transitory computer-readable medium having contents which configure a processing device to perform cryptographic operations on data using a word size, the performing cryptographic operations including applying an asymmetric cryptographic procedure operating over a finite field having an order, the asymmetric cryptographic procedure including performing a scalar multiplication operation between at least one operand, representing a curve point expressed by projective format coordinates, and a secret key, the scalar multiplication operation including an iterative procedure performing a set of operations at each iteration on a bit or on a group of consecutive bits of the secret key, the multiplication operation comprising, at each iteration,
randomizing values represented by a number of bits, of the projective format coordinates representing said at least one operand by multiplying the values of the projective format coordinates by a random value,
wherein
the random value is a product of a random number generated over a range having as an end value a first value, with a second value, which is larger than said first value,
said first value is a power of two of the word size multiplied by a multiplier value, minus one,
said second value is equal to a power of two of said number of bits divided by the first value, the multiplier value being an integer greater than or equal to one and smaller than a ratio of said number of bits to the word size.

18. The non-transitory computer-readable medium of claim 17, wherein an upper limit for the multiplier value is 4.

19. The non-transitory computer-readable medium of claim 17, wherein the multiplier value is 1 or 2.

20. The non-transitory computer-readable medium of claim 17, wherein the contents comprise instructions executed by cryptographic circuitry of the processing device.

* * * * *